United States Patent
Pares Isanta et al.

(10) Patent No.: US 9,290,210 B2
(45) Date of Patent: Mar. 22, 2016

(54) HOT MELT PLUG

(75) Inventors: Albert Pares Isanta, Les Franqueses del Valles (ES); Carlos Colomer, Barcelona (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1 day.

(21) Appl. No.: 14/127,535

(22) PCT Filed: Jun. 19, 2012

(86) PCT No.: PCT/US2012/043107
§ 371 (c)(1),
(2), (4) Date: Dec. 19, 2013

(87) PCT Pub. No.: WO2012/177613
PCT Pub. Date: Dec. 27, 2012

(65) Prior Publication Data
US 2014/0125081 A1    May 8, 2014

(30) Foreign Application Priority Data
Jun. 20, 2011   (ES) .................................. 201131037

(51) Int. Cl.
| B65D 39/00 | (2006.01) |
| B65D 41/60 | (2006.01) |
| B60J 9/00 | (2006.01) |
| B62D 25/24 | (2006.01) |

(52) U.S. Cl.
CPC ...................................... *B62D 25/24* (2013.01)

(58) Field of Classification Search
CPC ........ B62D 25/24; Y10S 220/19; B32B 15/08
USPC ........ 220/787, DIG. 19, 359.4; 296/1.06, 204
See application file for complete search history.

(56) References Cited

U.S. PATENT DOCUMENTS

| 4,801,040 | A | * | 1/1989 | Kraus ........................... 220/787 |
| 4,938,378 | A | * | 7/1990 | Kraus ........................... 220/789 |
| 5,267,667 | A | | 12/1993 | Cozzani |
| 6,319,436 | B1 | * | 11/2001 | Jaeger et al. ................. 264/40.6 |
| 6,557,208 | B2 | * | 5/2003 | Huet ............................... 16/2.1 |

(Continued)

FOREIGN PATENT DOCUMENTS

| DE | 3713503 C1 | 1/1988 |
| EP | 0631923 A1 | 1/1995 |
| EP | 0779203 A1 | 6/1997 |

(Continued)

OTHER PUBLICATIONS

International Search Report and Written Opinion corresponding to PCT/US2012/043107 dated Sep. 19, 2012.

*Primary Examiner* — Shawn M Braden
(74) *Attorney, Agent, or Firm* — Hauptman Ham, LLP

(57) ABSTRACT

Plug for sealing orifices, particularly for plugging and sealing orifices made in plates of vehicle bodies, basically comprising a body in the form of a pan whose outer wall is peripherally provided on its outer face with an upper flange and a lower flange that are opposite each other and diverge in opposite directions, said flanges defining an intermediate space for receiving the annular segment of the plate that surrounds the orifice to be sealed, and centering ribs to simplify the positioning of the plate and therefore simplify the installation operation, reducing the time needed for this operation.

18 Claims, 3 Drawing Sheets

(56) References Cited

U.S. PATENT DOCUMENTS

| | | | |
|---|---|---|---|
| 7,114,632 B2 * | 10/2006 | Kraus | 220/802 |
| 2009/0078704 A1 * | 3/2009 | Janke | 220/359.4 |

FOREIGN PATENT DOCUMENTS

| | | |
|---|---|---|
| EP | 1375308 A1 | 1/2004 |
| ES | 2006404 A6 | 4/1989 |
| ES | 1022542 U | 4/1993 |
| ES | 2097565 T3 | 4/1997 |
| ES | 2125148 A1 | 2/1999 |
| ES | 2240676 T3 | 10/2005 |
| WO | 2010149237 A1 | 12/2010 |
| WO | WO 2010149237 A1 * | 12/2010 |

\* cited by examiner

HOT MELT PLUG

OBJECT OF THE INVENTION

The present invention relates to a plug for sealing orifices, particularly orifices made in the plate of vehicle bodies.

BACKGROUND OF THE INVENTION

Known in the state of the art are various plugs or elements used to seal orifices made in vehicle body plates or in other components.

Specifically, the state of the art includes plugs consisting of a pan-like body with an outer wall provided on its outer face with a peripheral upper flange and a peripheral bottom flange that are opposite each other and diverge in opposite directions, determining an intermediate space for receiving the plate in which the orifice to be sealed is made.

An example of this can be seen in Spanish invention patents ES2006404 and ES2097565, which describe a plug with an elastic closure having characteristics meant to increase tightness, for which purpose it is provided with a heat-deformable gasket and legs for attaching the lid.

There are also numerous antecedents seeking a proper seal and great tightness in the closure of the plug in the orifice to be sealed, which is achieved by incorporating in the plug a material that melts, such as of the type known as a "hot melt adhesive", as can be seen in the plugs described in ES2125148, ES1022542U, ES2 240 676 EP631923, EP779203 or WO 2010/149237.

However, these have a drawback in that they can only be used to seal orifices of a specific nominal diameter, which means that it is necessary to manufacture different plugs to seal orifices of very similar diameters, such as 38 and 40 mm., which in addition to increasing manufacturing costs also creates the problem of increasing the stock of the factory or company that installs the plugs.

To solve this drawback there exist improved plugs which, to allow using them for different orifice diameters, incorporate elements that allow centering them in the orifice to be sealed. For this purpose, as in the example of U1067533, the outer wall of the plug body is provided on its inner face with rigid centering ribs that run vertically from the bottom end to the upper end of said inner wall.

In this way, after a certain length of the plug has been inserted in the orifice, the bottom flange, which has been folded upward due to its contact with the perimeter of the orifice, is released from the plate and acts due to its divergent configuration against the inner surface of the plate, ensuring that the plug is retained in the assembled position.

However, although these centering ribs do facilitate centering the plug in the hole, and thus allow this plug to be used with orifices of different diameters, the behaviour of these ribs can sometimes complicate the installation of the plug.

This difficulty arises because when the plug is inserted in the orifice, the plate must overcome the resistance of the lower lip, which meets the centering rib located on the outer face of the inner wall, hindering the installation.

This difficulty is further increased when the bottom flange also incorporates a hot-melt adhesive that helps sealing its upper face, which contacts the plate, as this melting material, before melting, increases the rigidity of the bottom flange whose resistance must be overcome when the plug is inserted in the orifice to be sealed; as explained above, this resistance is considerable, due to the presence of the centering rib that said lower lip meets.

In addition to the above, the presence of said melting material on the upper surface of the bottom flange makes the space between said lip and the centering rib even smaller, that is, it reduces the path that the lower flange has before it gives when the plug is inserted in the plate, attempting to overcome said lower flange so that the plate is located between said flange and the upper flange.

DESCRIPTION OF THE INVENTION

The plug for sealing orifices of the present invention overcomes the drawbacks of the state of the art discussed above, being constituted by a plug that facilitates its installation by reducing the effort required in the installation operation, which reduces the operation time, and therefore the costs, while ensuring a better seal and tightness as it can incorporate a greater amount of melting material.

Thus, the plug for sealing plate orifices of this invention, particularly for plates belonging to a vehicle body, presents constructive features meant to aid its centering in the orifice and reduce the effort required to install it.

Specifically, the plug for sealing orifices of the invention is of the type comprising a pan-like body with an outer wall peripherally provided on its outer face with an upper flange and a lower flange opposite each other, diverging in opposite directions, these flanges defining an intermediate space in which to receive the annular segment of the plate that surrounds the orifice to be sealed.

In addition, in order to simplify the centering of the part, the outer wall of the body comprises in its inner face some thin centering ribs separated from the inner vertical area of said outer wall, such that these ribs may be pushed, that is, they are flexible, offering a low resistance when inserting the plug in the orifice, at which time the plate pushes the lower flange upward, attempting to move past it, so that the plate will be left between said lower flange and the upper flange in its final position.

DESCRIPTION OF THE FIGURES

To complete the description being made and to aid a better understanding of the characteristics of the invention, the present specification is accompanied by a set of drawings where, for purpose of illustration only and in a non-limiting sense, the following is represented.

PREFERRED EMBODIMENT

Figure 1:
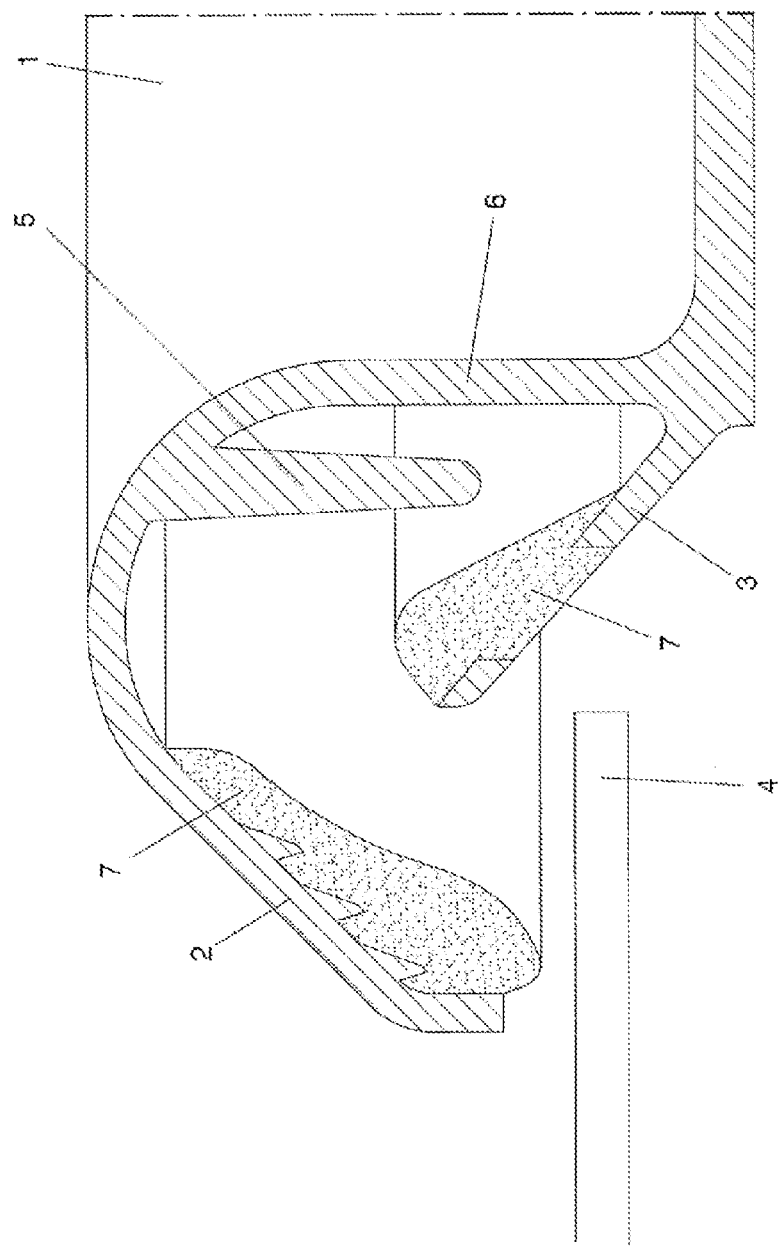
FIG. 1 shows a perspective cross-section view of the sealing plug of the invention.
Figure 2:
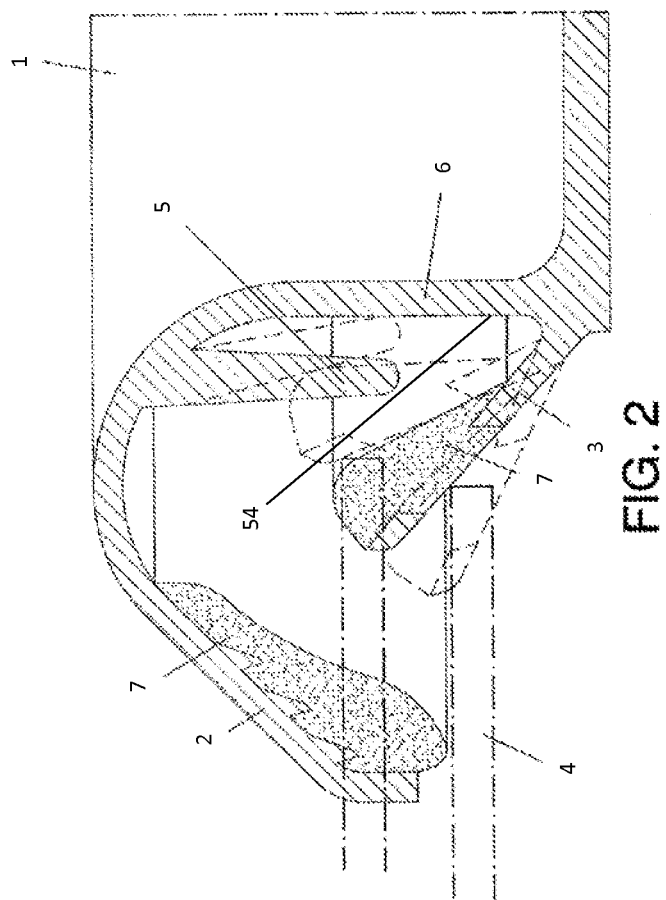
FIG. 2 shows a perspective cross-section view of the sealing plug of the invention that shows the movement of the centering rib when introducing the plate of the vehicle body in which the orifice to be sealed is present.
Figure 3:
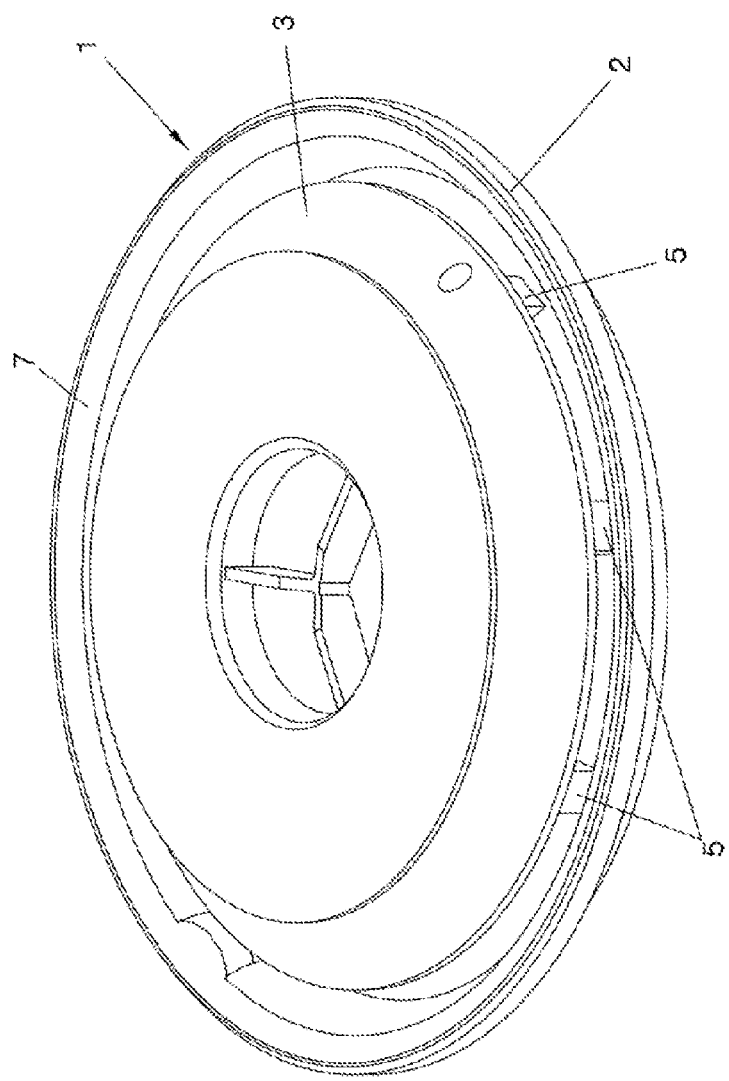
FIG. 3 shows a perspective cross-section view of the sealing plug object of the present invention.

As can be seen in FIGS. 1 to 3, a possible practical embodiment of the plug for sealing orifices of the present invention is one in which the plug comprises a body (1) in the form of a pan whose outer wall (54) is peripherally provided with an upper flange (2) and a lower flange (3) opposite each other and diverging in opposite directions, these flanges defining an intermediate space in which to receive the annular segment of the plate (4) that surrounds the orifice to be sealed.

In addition, as shown in the figures, and particularly in FIGS. 1 and 2, in order to facilitate centering the orifice to be sealed made in the plate (4), the body (1) of the plug comprises, in the inner face of the outer wall of the body some thin, flexible centering ribs (5) separated from the inner vertical area (6) of said outer wall, such that they provide little resistance and can be pushed when introducing the plug in the orifice, at which time the plate (4) pushes the lower flange (3) upward, attempting to pass said lower flange (3) so that the plate (4) is placed between the latter flange and the upper flange (2) in its final position.

These centering ribs (5) therefore aid in the positioning of the plate (4) and simplify the assembly, reducing the time required for the operation. As stated above, the ribs are flexible and can have any shape that allow them to be pushed by the plate (4) when the plug is inserted in its orifice.

Similarly, there can be any number of centering ribs (5), arranged symmetrically or asymmetrically as needed. An example of this arrangement for a possible embodiment of the invention is to place 8 centering ribs (5) placed at equiangular positions in a radial arrangement.

In addition, as explained before, in order to ensure a better sealing and tightness both the upper flange (2) and lower flange (3) can incorporate a melting material (7) in the faces that will contact the plate (4). In this way, according to a possible practical embodiment shown in FIGS. 1 and 2, the melting material (7) will be placed on both flanges (2, 3), although it could also not be present in either or only on the upper flange (2).

As can also be seen in FIGS. 1 and 2, both the upper flange (2) and the lower flange (3) may comprise, on the face whose surface will be in contact with the melting material (7), at least one irregular area (9), toothed, rough or similar, to aid the attachment of said melting material (7) to this surface before applying the heat that allows it to pass to its operative phase.

This melting material (7), according to a possible embodiment of the invention, can be a foamy material.

The invention claimed is:

1. Plug for sealing orifices, to plug and seal orifices made in plates, comprising a body in the form of a pan whose outer wall is peripherally provided on its outer face with an upper flange and a lower flange that are opposite each other and diverge in opposite directions, said flanges defining an intermediate space for receiving an annular segment of the plate that surrounds the orifice to be sealed, wherein it additionally comprises flexible centering ribs on an inner face of the outer wall of the body, wherein the ribs are configured to be depressed such that an end of the rib contacts the outer wall from a location where the end of the rib previously did not contact the outer wall.

2. Plug for sealing orifices according to claim 1, wherein the centering ribs are separated from an inner vertical area of the outer wall of the body.

3. Plug for sealing orifices according to claim 1, wherein the upper flange incorporates a melting material in a face that will contact the plate.

4. Plug for sealing orifices according to claim 1, wherein it comprises centering ribs evenly spaced in a radial arrangement.

5. Plug for sealing orifices according to claim 1, wherein the outer wall, the upper flange and the lower flange are part of a monolithic component.

6. Plug for sealing orifices according to claim 1, wherein the ribs are situated such that there is a gap between respective ribs and the upper flange on first sides of the respective ribs and a gap between respective ribs and the outer wall on second sides of the respective ribs opposite the first sides.

7. Plug for sealing orifices according to claim 1, wherein the outer wall, the upper flange, the lower flange and the ribs are part of a monolithic component.

8. Plug for sealing orifices, to plug and seal orifices made in plates, comprising:
a body comprising a base portion and an outer wall extending away from the base portion at at least about a normal direction to a direction of extension of the base portion; and
flexible centering ribs on an inner face of the outer wall of the body, wherein
the outer wall includes, on an outer face thereof, an upper flange and a lower flange, wherein the upper flange and the lower flange are opposite each other and diverge in opposite directions, and
the flanges define an intermediate space for receiving an annular segment of the plate that surrounds the orifice to be sealed,
wherein the ribs are configured to be depressed during sealing of the orifice such that an end of the rib contacts the outer wall from a location where the end of the rib previously did not contact the outer wall.

9. Plug for sealing orifices according to claim 8, wherein the centering ribs are separated from an inner vertical area of the outer wall of the body.

10. Plug for sealing orifices according to claim 8, wherein the upper flange incorporates a melting material in a face that will contact the plate.

11. Plug for sealing orifices according to claim 10, wherein the face that incorporates the melting material comprises an irregular area.

12. Plug for sealing orifices according to claim 8, wherein the centering ribs are evenly spaced in a radial arrangement.

13. Plug for sealing orifices according to claim 8, wherein the plug is a monolithic component.

14. Plug for sealing orifices according to claim 8, wherein the outer wall, the upper flange and the lower flange are part of a monolithic component.

15. Plug for sealing orifices according to claim 8, wherein the ribs are situated such that there is a gap between respective ribs and the upper flange on first sides of the respective ribs and a gap between respective ribs and the outer wall on second sides of the respective ribs opposite the first sides.

16. Plug for sealing orifices according to claim 8, wherein the outer wall, the upper flange, the lower flange and the ribs are part of a monolithic component.

17. Plug for sealing orifices according to claim 1, wherein the ribs are configured to be depressed during sealing of the orifice such that the end of the rib contacts the outer wall from the location where the end of the rib previously did not contact the outer wall.

18. Plug for sealing orifices, to plug and seal orifices made in plates, comprising:
a body comprising a base portion and an outer wall extending away from the base portion at at least about a normal direction to a direction of extension of the base portion; and
flexible centering ribs on an inner face of the outer wall of the body, wherein
the outer wall includes, on an outer face thereof, an upper flange and a lower flange, wherein the upper flange and the lower flange are opposite each other and diverge in opposite directions, and
the flanges define an intermediate space for receiving an annular segment of the plate that surrounds the orifice to be sealed,
wherein the ribs are configured to be depressed such that an end of the rib contacts the outer wall from a location where the end of the rib previously did not contact the outer wall.

* * * * *